(12) United States Patent
Bloom

(10) Patent No.: US 8,881,000 B1
(45) Date of Patent: Nov. 4, 2014

(54) SYSTEM AND METHOD FOR INFORMING USERS OF AN ACTION TO BE PERFORMED BY A WEB COMPONENT

(75) Inventor: David Jeffery Bloom, Mountain View, CA (US)

(73) Assignee: Google Inc., Mountain View, CA (US)

( * ) Notice: Subject to any disclaimer, the term of this patent is extended or adjusted under 35 U.S.C. 154(b) by 281 days.

(21) Appl. No.: 13/347,600

(22) Filed: Jan. 10, 2012

Related U.S. Application Data

(60) Provisional application No. 61/528,132, filed on Aug. 26, 2011.

(51) Int. Cl.
*G06F 17/21* (2006.01)

(52) U.S. Cl.
USPC ........................................................ 715/235

(58) Field of Classification Search
USPC .................................. 715/227, 235
See application file for complete search history.

(56) References Cited

U.S. PATENT DOCUMENTS

| | | | | |
|---|---|---|---|---|
| 7,392,510 | B1 * | 6/2008 | Treder et al. .................. | 717/128 |
| 7,562,304 | B2 * | 7/2009 | Dixon et al. .................. | 715/738 |
| 7,865,873 | B1 * | 1/2011 | Zoellner et al. ............... | 717/110 |
| 7,975,020 | B1 * | 7/2011 | Green et al. ................... | 709/217 |
| 8,225,396 | B1 * | 7/2012 | Gauvin ......................... | 726/22 |
| 8,250,145 | B2 * | 8/2012 | Zuckerberg et al. .......... | 709/204 |
| 2006/0101514 | A1 * | 5/2006 | Milener et al. ................ | 726/22 |
| 2006/0253581 | A1 * | 11/2006 | Dixon et al. .................. | 709/225 |
| 2007/0038956 | A1 * | 2/2007 | Morris ........................... | 715/808 |
| 2007/0094355 | A1 * | 4/2007 | Mulakala et al. ............. | 709/219 |
| 2007/0255821 | A1 * | 11/2007 | Ge et al. ......................... | 709/224 |
| 2007/0256003 | A1 * | 11/2007 | Wagoner et al. ............. | 715/501.1 |
| 2009/0064337 | A1 * | 3/2009 | Chien ............................. | 726/25 |
| 2009/0182589 | A1 * | 7/2009 | Kendall et al. ................ | 705/5 |
| 2010/0024033 | A1 * | 1/2010 | Kang et al. .................... | 726/23 |
| 2010/0088761 | A1 * | 4/2010 | Podjarny et al. .............. | 726/22 |
| 2011/0016533 | A1 * | 1/2011 | Zeigler et al. ................. | 726/26 |
| 2011/0131106 | A1 * | 6/2011 | Eberstadt et al. ............. | 705/26.1 |
| 2011/0154130 | A1 * | 6/2011 | Helander et al. .............. | 714/48 |
| 2011/0231240 | A1 * | 9/2011 | Schoen et al. ................ | 705/14.41 |
| 2011/0239294 | A1 * | 9/2011 | Kim et al. ...................... | 726/22 |
| 2012/0150661 | A1 * | 6/2012 | DeStein et al. ............... | 705/14.72 |
| 2012/0210247 | A1 * | 8/2012 | Khouri et al. ................. | 715/751 |

OTHER PUBLICATIONS

Lundeen, Rich, Jesse Ou, and Travis Rhodes. "New Ways I'm Going to Hack Your Web App." Blackhat AD (2011), p. 1-11.*
Rydstedt, Gustav, et al. "Busting frame busting: a study of clickjacking vulnerabilities at popular sites." IEEE Oakland Web 2 (2010), p. 1-13.*

(Continued)

*Primary Examiner* — Frank D Mills
(74) *Attorney, Agent, or Firm* — McDermott Will & Emery LLP

(57) ABSTRACT

A system and method is disclosed for informing a user of an action to be performed by a web component in a domain of a primary website. A web component is provided to a web browser for display in connection with a website. The web component includes code that is executed in a different web domain than the website. On receiving an indication that a user has moved a cursor over the web component, the web component generates an alert informing the user of the action to be performed by the web component before the user activates the web component.

20 Claims, 5 Drawing Sheets

(56) References Cited

OTHER PUBLICATIONS

Balduzzi, Marco, et al. "A solution for the automated detection of clickjacking attacks." Proceedings of the 5th ACM Symposium on Information, Computer and Communications Security. ACM, 2010, p. 135-144.*

"Flying Around With Hovercards", Twitter Blog, Feb. 3, 2010, retrieved from <http://blog.twitter.com/2010/02/flying-around-with-hovercards.html>.

Kincaid, Jason, Facebook Borrows Another Feature From Twitter (Or Was It FriendFeed?): The Hovercard, Apr. 19, 2010, retrieved from <http://techcrunch.com/2010/04/19/facebook-borrows-another-feature-from-twitter-or-was-it-friendfeed-the-hovercard>.

"Likejacking", Wikipedia—The Free Encyclopedia, last viewed on Jan. 16, 2012, retrieved from <http://en.wikipedia.org/wiki/Likejacking>.

* cited by examiner

SYSTEM AND METHOD FOR INFORMING USERS OF AN ACTION TO BE PERFORMED BY A WEB COMPONENT

The present application claims priority benefit under 35 U.S.C. §119(e) from U.S. Provisional Application No. 61/528,132, filed Aug. 26, 2011, which is incorporated herein by reference in its entirety.

TECHNICAL FIELD

The subject technology relates generally to the display of websites and website components between multiple web domains.

BACKGROUND

Some websites may include in their content web components hosted by other websites. For example, a third-party website may include a primary website's component to allow users interacting with the third-party website to transmit information directly to the primary website. If a user interacting with the web component is registered with the primary website, the primary website may also associate the transmitted information with the user's account. Some web components used in connection with social networks may include a URL link that, when selected, informs the primary website that the user "approves" or "disapproves" a feature of the third-party website and updates the user's account accordingly. Since cookies and code cannot be shared across multiple domains, a web component may not be modified by a third-party, and a primary website can trust that a selection made at the component is valid. However, some third-party websites have sought to surreptitiously hide or disguise these links in order to lure unsuspecting users into clicking on them.

SUMMARY

The subject technology provides a system and method for managing user web browsing information. According to one aspect, the system includes a method for informing a user of an action to be performed by a web component. The method may include receiving a webpage from a first domain at a web browser executing on one or more computing devices, displaying the webpage from the first domain using the one or more computer devices, on a display of the webpage from the first domain, providing the web component from a second domain to the web browser for display in connection with instructions embedded within the webpage, receiving an indication that a position indicator has moved over a display area of the web browser associated with the web component, based at least in part on receiving the indication that the position indicator has moved over the display area of the web browser associated with the web component, generating for display in the web browser an alert describing an action associated with the web component in the second domain.

In another aspect, a machine-readable medium includes instructions stored thereon that, when executed, cause a machine or computer to perform a method of informing a user of an action to be performed by a web component. In this regard, the method may include providing a web component associated with a primary website for display in connection with a webpage of a third-party website. The web component may include program instructions that, when executed by a web browser, configure the web browser to receive an indication that a user has moved a cursor over a display area associated with the web component and the third-party website, and, on receiving the indication, display an alert indicating an action to be performed by the web component in a domain of the third-party website.

In a further aspect, a system includes a processor and a memory. The memory includes instructions that, when executed, provide a page element to a web browser from a first web domain, the page element configured to be displayed in connection with a webpage of a third-party website from a second domain. The page element, when loaded and displayed by a web browser in connection with a display of the webpage, may generate an alert in the web browser on an indication that a position indicator has moved over a display area of the web browser associated with the page element, and the alert may indicate an action to be performed by the web component in the first domain It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
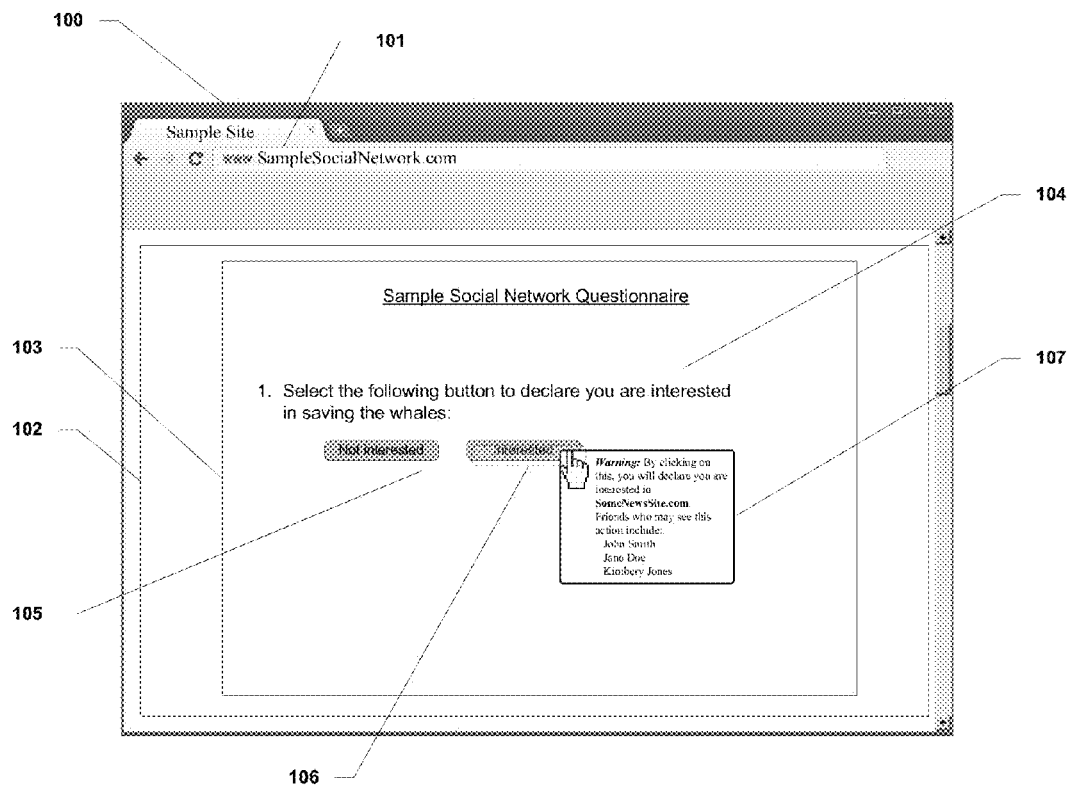
FIG. 1 depicts a webpage, displayed by a web browser, including one or more controls for performing an action in a different domain than the displayed webpage according to one aspect of the subject technology.

FIG. 1 depicts a webpage, displayed by a web browser, including one or more controls for performing an action in a different domain than the displayed webpage according to one aspect of the subject technology. Web browser 100 is display on a computer-enabled device (for example, device 401 of FIG. 4), and includes an address bar 101 for user-generated input of a web address, and a content area 102 for displaying electronic pages of websites navigated by browser 100 on input of a web address into address bar 101 or on clicking on a hyperlink. In the depicted example, a webpage 103 is displayed that includes some text 104, and one or more page elements, including one or more visible action controls 105 and/or one or more invisible action controls 106. The displayed webpage is part of a larger third-party website (for example, a collection of electronic pages displayed by a web browser, code for generating the pages, or servers responsible for hosting the pages, or the like) hosted in a third-party domain (for example, the domain "www.SampleSocialNetwork.com"). As will be described in further detail, a control 105 and/or 106 may perform an action related to a different web site in a different web domain than the website of the displayed webpage.

A control 105 or 106 may include a web component that executes an action for a primary website in a primary domain. The term "action" as used herein encompasses its plain and ordinary meaning, including, but not limited to, performing an affirmative operation or function, or causing a specific decision to be made, as a result of an interaction with the component performing the action (for example, an indication that a user clicked on the web component using a mouse or other device). For example, the action to be performed by the web component may include notifying the primary website whether a user approves of, or is interested in, a feature associated with the third-party website. The term "feature" as used herein encompasses its plain and ordinary meaning, including, but not limited to, any characteristic of a website, presentation, topic, article, story, graphic, or video provided by, or associated with, the website, which is capable of being associated with, or endorsed, criticized, approved or disapproved by, one or more users. For example, the action may include an annotation expressing an endorsement or criticism of a topic presented by a third-party web site (for example, notifying others that the user likes or dislikes the topic). Control 105 and/or 106 may be displayed to a user in connection with a third-party website, though include code hosted by, and executed on, the primary website. Control 105 and/or 106 may, for example, be extended to webpage 103 for display to the user via a window or frame created on webpage 103. The window or frame, for example, may be positioned on webpage 103 and/or implemented as an iframe.

Since the code for the control does not exist on the third-party website or the third-party domain, it cannot be modified by the third-party website. Some third-party websites may seek to surreptitiously hide or disguise a control 106 to hide the action it performs, in order to lure unsuspecting users into clicking on the control. In the depicted example, a control 106 is implemented on a webpage by hiding the control in a transparent layer. As will be described in further detail, the subject technology provides a control that, even if hidden or disguised by a nefarious website, may alert a user of an action to be performed by the control before the user activates the control (for example, by providing an alert on receiving an indication that the user has moved a position indicator over the control). In this manner, the user, being aware of an action that would have otherwise remained unknown (for example, until the action is performed), may choose not activate the control.

In the depicted example, a webpage 103 is asking the user a seemingly innocuous request; that is, to declare whether the user is interested in "saving the whales." Under the scenes, control 106 is implemented on an invisible layer and positioned above the benign control 105. Clicking a pointing device upon visible control 105 may also cause invisible control 106 to be activated. Control 106 is configured to register with a primary site that the user is interested in the third-party website, SampleNewsSite.com, and to send a notification to a list of persons associated with the user, informing them of that interest. Because control 106 cannot be seen, these actions may take place without the knowledge of the user performing the action.

The subject technology includes generating instructions that, when executed, generates a control 105 or 106 for use on a third-party website. The control's instructions may be configured to be executed on a primary website and not alterable by the third-party website. The instructions may configure the control to generate an alert 107 in browser 100 in anticipation of an action to be performed by the web component. The term "alert" as used herein encompasses its plain and ordinary meaning, including, but not limited to, providing graphic, text, or video based indicator that provides a warning or other visual or auditory advisory to proceed with caution when interacting with the component providing the alert. For example, alert 107 may be generated when a user moves a position indicator (for example, a mouse cursor) over a control 106. Alert 107 may indicate to the user the action to be performed by control 106 in the primary domain. As illustrated by the depicted example, alert 107 may indicate to the user other users who may be notified of the action once it is performed by the user. Thus, even where control 106 has been hidden or disguised, alert 107 may warn the user of the ultimate action before control 106 is activated.

Figure 2:
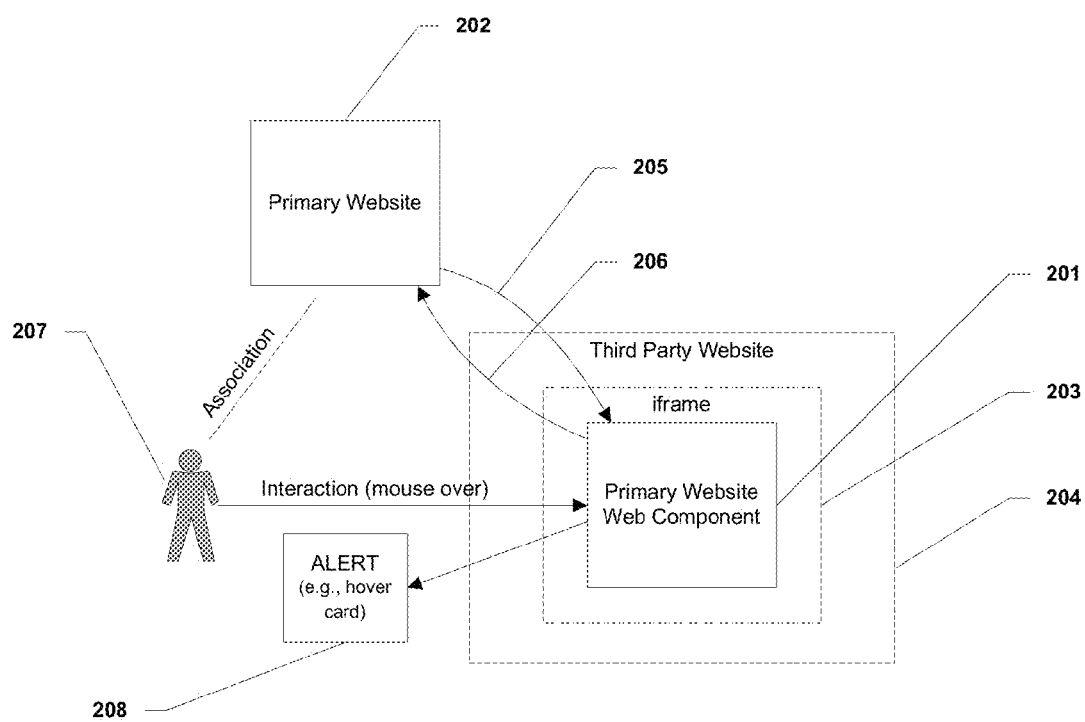
FIG. 2 is a diagram of a system for informing a user of an action to be performed by a web component according to one aspect of the subject technology.

FIG. 2 is a diagram of a system for informing a user of an action to be performed by a web component according to one aspect of the subject technology. A web component 201 may be generated by a primary website 202 and displayed in, for example, a frame 203 (for example, an iframe) of a third-party website 204. Third-party website 204 may be operating in a first domain (for example, at "www.[first_domain].com) and primary website 202 may be operating in a second domain (for example, at "www.[second_domain].com). On a display of third-party website 204, web component 201 may be provided for display within frame 203 in connection with a request by third-party website 204 to display web component 201 from the second domain. For example, the following HTML instruction may be included in third-party website 204 to cause a web browser to retrieve and display web component 201 from the second domain in connection with displaying website 204:

<iframe src="http://www.[second_domain].com/plugins/approve.php?href=http%3A%2F%2F[first_domain].com%2F[webpage].html& action=approve&colorscheme=light&font&height=70" scrolling="no" frameborder="0"
style="border:none; overflow:hidden; width:50px; height: 70px;"
allowTransparency="true"></iframe>

Accordingly, web component 201 may be loaded 205 from a server (for example, server 403) associated with a primary website 202 into frame 203 of third-party website 204 (for example, as a graphic, hyperlink, icon, or the like), and frame 203 may provide a window into the domain of the primary website 202. In this regard, all interaction with web component 201 may be conducted at primary website 202 via frame 203. For example, web component 201 may be configured to, on receiving a signal representative of an affirmative user-interaction with web component 201 (for example, an indication that a user clicked on the web component using a mouse or other device), perform an action 206 at primary website 202. Action 206 may include, for example, notifying a primary website 202 that a user 207 associated with primary website 202 is interested in one or more features related to the third-party website 204, and/or executing instructions to modify an account associated with user 207.

Web component 201 may include scripting code that, when the component is displayed by a browser (for example, browser 100), web component 201 configures the browser to generate an alert 208 when the browser receives an indication that a position indicator (for example, a display cursor) has moved over a display area of the browser associated with web component 201. The scripting code may include JavaScript and may be configured to load and/or execute when frame 203 is rendered by the browser (for example, when the browser navigates to third-party website 204). In one aspect, the scripting code may preempt and therefore load and execute before other scripting code of third-party website 204 and/or other related page elements. This nearly instantaneous loading and execution within frame 203 may prevent the other scripting code from intercepting and/or masking its operations.

In some aspects, alert 208 may include a hover card graphic including a short text statement describing the action to be performed by web component 201 and what other users may be notified of the action once it is performed (see, for example, alert 107 of FIG. 1). Alert 208 may be implemented as a cascading style sheet (CSS) cursor that is activated when a user-controlled pointing device (for example, a mouse) is moved above its action mechanism (for example, a button or link). When web component 201 is displayed by a third-party website 202, the scripting code for the CSS cursor may load almost instantaneously, is executed at a primary website 202, and cannot be blocked by the third-party website. For example, web component 201 may generate alert 208 for display in a web browser irrespective of instructions executing in connection with the third-party website. By forcing the CSS cursor to be displayed to a user 207 before the user selects the web component's action mechanism, malicious third-party web sites may thus be prevented from being able to hide or disguise the action web component 201 performs. In some aspects, the size of the cursor may be up to 128×128 pixels (for example, including a hand cursor and a hover card). In some browsers (for example, Firefox, Chrome, and Safari), the cursor may be rendered using a <canvas> element. In some browsers (for example, Internet Explorer) the hover card graphic may be rendered as a pop-up window (for example, using an HTML window.createPopup( )).

Figure 3:
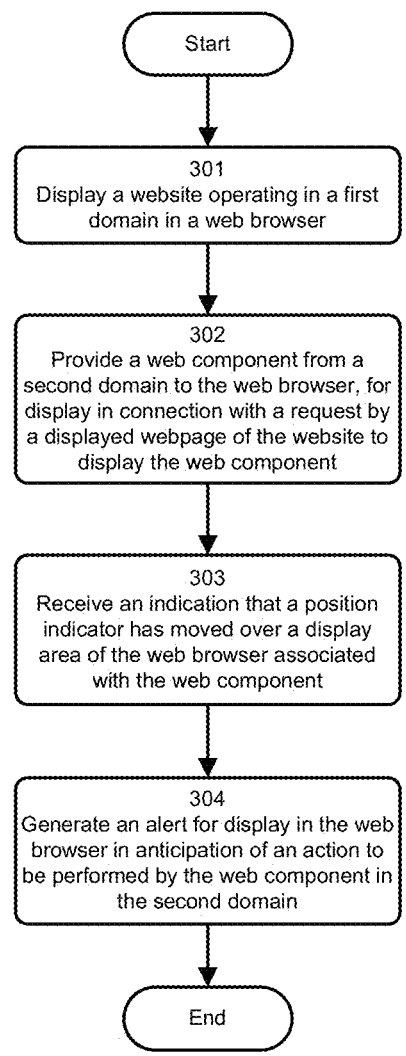
FIG. 3 is a flowchart illustrating a process for informing a user of an action to be performed by a web component according to one aspect of the subject technology.

FIG. 3 is a flowchart illustrating a process for informing a user of an action to be performed by a web component according to one aspect of the subject technology. In step 301, a website operating in a first domain is displayed by a web browser. The website may include a collection of webpages and/or graphics collectively hosted by a remote server. Many web browsers are configured to share information only with servers in the same Internet domain. For example, a web browser may send HTTP Cookies to only the server setting them or servers having the same domain name of the server that set the cookies. A webpage provided by the website may, however, include script that directs the web browser to load components from other domains to be displayed in connection with the webpage. In this regard, the website operating in the first domain may appear to display components from other domains but will be agnostic to how those components interact with the user.

In step 302, a web component is provided from a second domain to the web browser for display in connection with a request by a displayed webpage of the website to display the web component (for example, resulting from instructions embedded within the webpage). As described previously, the request by the webpage may include a script that directs the web browser to load the web component from a server on the second domain. The web component may be configured with browser instructions (for example, scripting language) for execution by the browser. Because the browser instructions were generated from the second domain (for example, a different domain than the first domain), the webpage may be unaware of the browser instructions or what action they may perform. In this example, the browser instructions, when executed by the web browser, generate for display in the web browser an alert of an action to be performed by the web component before the user activates the web component.

In step 303, an indication is received that a position indicator (for example, a display cursor) has moved over a display area of a web browser associated with the web component. In one aspect, the indication may be received by the web browser and processed in connection with the execution of the previously described browser instructions. In another aspect, the browser instructions may generate commands to be sent to a server associated with the web component and located in the second domain via an asynchronous procedural call. In this regard, the server may return information to be displayed in connection with the alert, for example, based on one or more prior interactions of the user related to the second domain. The returned information may include one or more users (for example, within the user's social network) that may be notified of the action when it is performed (for example, via a message stream).

In step 304, the alert is generated for display in the web browser in anticipation of the action. The alert may include a popup window or CSS cursor in the form of a hovercard graphic, and may include one or more graphics and/or text elements describing the action to be performed in the second domain. The alert may, for example, warn the user that activating the component may update an account related to the user (for example, hosted by a server in the second domain) with information showing an association between the user and a hidden feature of the website that the user would have otherwise been unaware of.

Figure 4:
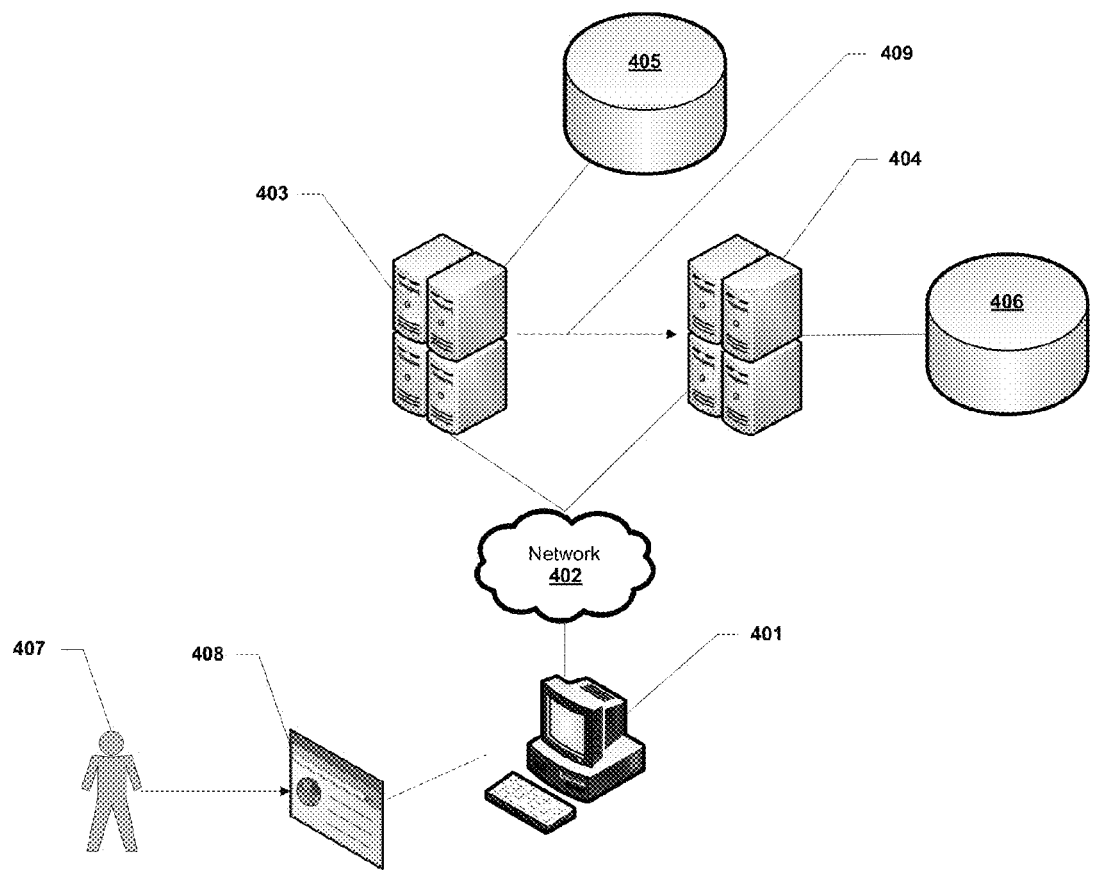
FIG. 4 is a diagram illustrating server and database components of a system for informing a user of an action to be performed by a web component according to one aspect of the subject technology.

FIG. 4 is a diagram illustrating server and database components of a system for informing a user of an action to be performed by a web component according to one aspect of the subject technology. A system compatible with the subject technology may include a computer-enabled device 401 (for example a personal computer, tablet computer, PDA, Smartphone, a television or other display device with one or more computing devices embedded therein or attached thereto, or the like) operably connected to a network 402 (for example, the Internet, LAN/WAN, or the like). Through network 402, device 401 may also be operably connected to one or more primary domain web servers 403 for the download and display of a first website content, and one or more third-party domain web servers 404 for the download and display of a second website content. In one example, web servers 403 may host a social network in a primary web domain (for example, www.samplesocialnetwork.com), and web servers 404 may host one or more third-party websites at a web address of a third-party web domain (for example, www.thirdpartywebsite.com).

Web servers 403 may be operably connected to one or more databases 405 for the storage of website content and user account information related to one or more websites hosted by servers 403. Web servers 404 may be operably connected to one or more databases 406 for similar storage purposes related to one or more websites hosted on web servers 404. A user 407 may use device 401 to connect to the one or more servers 403 or 404 to view web content. In one aspect, user 407 may interact with a user interface 408 (for example, browser 100) provided by device 401, and having controls (for example, drop down lists, selection choices, text inputs or the like) for navigating to and for displaying one or more websites, search results, and the like. The one or more servers 403 and 404 are operable to receive and respond to user-generated navigation requests from a user interface 408, to serve one or more websites to be displayed at user interface 408.

User 407 may register account information with primary web server 403, which may further be stored on a database 405. The account information may include details about user 407, friends of user 407 who also use the same or related website as user 407, what third-party websites user 407 is interested in, and the like. A website hosted by one or more web servers 403 may include a web component (for example, web component 201) for storing and/or updating information to the account of a user who interacts with the web component. In another aspect, one or more servers 404 may, on the user navigating to a website hosted by servers 404, load 409 the web component via network 402 for display (for example, in an iframe 203 or webpage) at the website. To this end, user 407 may interact with the web component while viewing the website hosted by one or more servers 404, causing information to be registered to the user's account at the one or more web servers 403.

Figure 5:
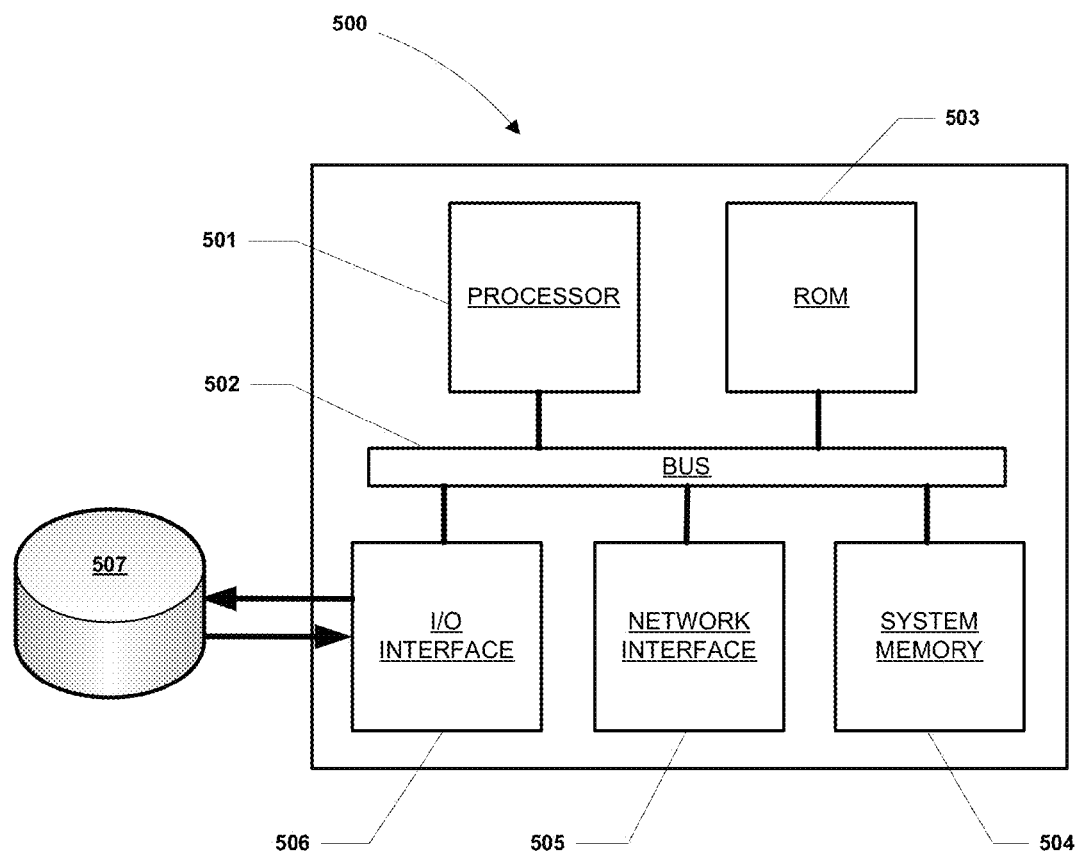
FIG. 5 is a diagram illustrating a server system for informing a user of an action to be performed by a web component, including a processor and other internal components, according to one aspect of the subject technology.

FIG. 5 is a diagram illustrating a server system for informing a user of an action to be performed by a web component, including a processor and other internal components, according to one aspect of the subject technology. In some aspects, a computerized device 500 (for example, computer-enabled device 401 or the like) includes several internal components such as a processor 501, a system bus 502, read-only memory 503, system memory 504, network interface 505, I/O interface 506, and the like. In one aspect, processor 501 may also be communication with a storage medium 507 (for example, a hard drive, database, or data cloud) via I/O interface 506. In some aspects, all of these elements of device 500 may be integrated into a single device. In other aspects, these elements may be configured as separate components.

Processor 501 may be configured to execute code or instructions to perform the operations and functionality described herein, manage request flow and address mappings, and to perform calculations and generate commands. Processor 501 is configured to monitor and control the operation of the components in server 500. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 501. Likewise, one or more sequences of instructions may be software stored and read from ROM 503, system memory 504, or received from a storage medium 507 (for example, via I/O interface 506). ROM 503, system memory 504, and storage medium 507 represent examples of machine or computer readable media on which instructions/code may be executable by processor 501. Machine or computer readable media may generally refer to any medium or media used to provide instructions to processor 501, including both volatile media, such as dynamic memory used for system memory 504 or for buffers within processor 501, and non-volatile media, such as electronic media, optical media, and magnetic media.

In some aspects, processor 501 is configured to communicate with one or more external devices (for example, via I/O interface 506). Processor 501 is further configured to read data stored in system memory 504 and/or storage medium 507 and to transfer the read data to the one or more external devices in response to a request from the one or more external devices. The read data may include one or more webpages and/or other software presentation to be rendered on the one or more external devices. The one or more external devices may include a computing system such as a personal computer, a server, a workstation, a laptop computer, a television with one or more processors embedded therein or coupled thereto, a PDA, a smart phone, or the like.

In some aspects, system memory 504 represents volatile memory used to temporarily store data and information used to manage device 500. According to one aspect of the subject technology, system memory 504 is random access memory (RAM) such as double data rate (DDR) RAM. Other types of RAM also may be used to implement system memory 504. Memory 504 may be implemented using a single RAM module or multiple RAM modules. While system memory 504 is depicted as being part of device 500, those skilled in the art will recognize that system memory 504 may be separate from device 500 without departing from the scope of the subject technology. Alternatively, system memory 504 may be a non-volatile memory such as a magnetic disk, flash memory, peripheral SSD, and the like.

I/O interface 506 may be configured to be coupled to one or more external devices, to receive data from the one or more external devices and to send data to the one or more external devices. I/O interface 506 may include both electrical and physical connections for operably coupling I/O interface 506 to processor 501, for example, via the bus 502. I/O interface 506 is configured to communicate data, addresses, and control signals between the internal components attached to bus 502 (for example, processor 501) and one or more external devices (for example, a hard drive). I/O interface 506 may be configured to implement a standard interface, such as Serial-Attached SCSI (SAS), Fiber Channel interface, PCI Express (PCIe), SATA, USB, and the like. I/O interface 506 may be configured to implement only one interface. Alternatively, I/O interface 506 may be configured to implement multiple interfaces, which are individually selectable using a configuration parameter selected by a user or programmed at the time of assembly. I/O interface 506 may include one or more buffers for buffering transmissions between one or more external devices and bus 502 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more webpages, one or more servers used to host or store web related content, and the like. Accordingly, the term website may be used interchangeably with the terms webpage and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for informing a user of an action to be performed by a web component, comprising:
    receiving a webpage from a first domain at a web browser executing on one or more computing devices;
    displaying the webpage from the first domain using the one or more computer devices;
    on a display of the webpage from the first domain, receiving the web component from a second domain at the web browser in connection with instructions embedded within the webpage;
    receiving an indication that a position indicator has moved over a display area of the web browser associated with the web component;
    in response to receiving the indication that the position indicator has moved over the display area and before receiving a selection within the display area, generating for display in the web browser an alert describing a hidden action, performed in the second domain, which would result from a selection within the display area.

2. The method of claim 1, wherein the web component comprises browser instructions for execution by the web browser, and wherein the browser instructions, when executed by the browser, cause the alert to be displayed in the web browser on receiving the indication.

3. The method of claim 2, wherein the request by the website includes one or more page instructions configured to cause the web browser to download the web component from the second domain into a frame supplied by the webpage.

4. The method of claim 3, wherein the browser instructions are configured to load within the frame on navigation of the web browser to the webpage.

5. The method of claim 3, wherein the alert includes a hover card graphic.

6. The method of claim 3, wherein the frame is an iframe.

7. The method of claim 1, wherein the action comprises notifying a server located in the second domain of an association between a user and a feature associated with the webpage.

8. The method of claim 1, further comprising:
    on receiving the indication, determining one or more other users that will be notified of the action when the action is performed, the other users being in a social network with the user,
    wherein the alert includes a message informing the user that the one or more other users will be notified of the action.

9. The method of claim 1, wherein the web component is loaded by the webpage in a transparent layer.

10. A non-transitory machine-readable medium having instructions stored thereon that, when executed, cause a machine or computer to perform a method of informing a user of an action to be performed by a web component, the method comprising:
    providing a web component associated with a primary website for display in connection with a webpage of a third-party website, the web component including program instructions that, when executed by a web browser, configure the web browser to:
    receive an indication that a user has moved a cursor over a display area associated with the web component and the third-party website; and
    on receiving the indication that the user has moved the cursor over the display area and before receiving a selection within the display area, display an alert indicating a hidden action to be performed by the web component in a domain of the third-party website, and which would result from a selection within the display area.

11. The non-transitory machine-readable medium of claim 10, wherein the webpage is from a domain different than the domain of the primary website.

12. The non-transitory machine-readable medium of claim 11, wherein providing the web component for display in connection with the webpage includes:
   providing the web component for download from a server associated with the primary website to an iframe provided by the webpage.

13. The non-transitory machine-readable medium of claim 11, wherein, the program instructions, when executed by the web browser, configure the web browser to:
   receive a signal representative of an affirmative user-interaction with the web component; and
   on receiving the signal, performing the action, wherein the action includes notifying the primary website that a user is interested in one or more features related to the third-party website.

14. The non-transitory machine-readable medium of claim 11, wherein the alert includes a popup window.

15. The non-transitory machine-readable medium of claim 11, wherein the alert includes a cascading style sheet cursor displayed in the iframe.

16. A system, comprising:
   a processor; and
   a memory including instructions that, when executed, provide a page element to a web browser from a first web domain, the page element configured to be displayed in connection with a webpage of a third-party website from a second domain,
   wherein the page element, when loaded and displayed by the web browser in connection with a display of the webpage, generates an alert in the web browser on an indication that a position indicator has moved over a display area of the web browser associated with the page element and before receiving a selection within the display area, and
   wherein the alert indicates a hidden action to be performed by the web component in the first domain and which would result from a selection within the display area.

17. The system of claim 16, wherein the page element includes scripting code associated with a primary website configured to, on the indication, generate the alert for display in the web browser irrespective of instructions executing in connection with the third-party website.

18. The system of claim 17, wherein the page element is configured to be loaded in connection with the third-party website in a transparent layer.

19. The system of claim 16, wherein the position indicator includes a cursor.

20. The system of claim 16, wherein the action to be performed by the page element includes notifying a server associated with a primary website that a user associated with the primary website is interested in the third-party website.

* * * * *